United States Patent Office 2,993,047
Patented July 18, 1961

2,993,047
CONDENSED HETEROCYCLIC COMPOUNDS
Newman M. Bortnick, Oreland, and Marian F. Fegley, Mont Clare, Pa., assignors to Rohm & Haas Company, Philadelphia, Pa., a corporation of Delaware
No Drawing. Filed Mar. 3, 1958, Ser. No. 718,505
16 Claims. (Cl. 260—251)

This invention deals with specific condensed heterocyclic compounds as new compositions of matter. It also deals with a method for the preparation of these specific condensed heterocyclic compounds. The compounds of this invention are prepared by hydrogenating a compound having the formula

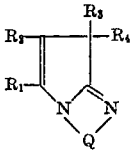

to produce a compound having the formula

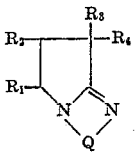

The symbol $R_1$ represents hydrocarbon groups of one to ten carbon atoms, preferably alkyl, aralkyl, cycloalkyl, aryl, and alkaryl. The symbol $R_2$ represents a hydrogen atom or an alkyl group of one to four carbon atoms. The symbols $R_3$ and $R_4$ may be hydrogen atoms or hydrocarbon groups containing from one to ten carbon atoms including alkyl, aralkyl, cycloalkyl, aryl, and alkaryl groups. In addition, $R_1$ and $R_2$ taken together with the carbon atoms to which they are joined may form a carbocyclic ring containing five to six carbon atoms which in turn may have alkyl substituents containing a total of no more than four additional carbon atoms. In addition, $R_2$ and $R_3$ taken together with the carbon atoms to which they are joined may form a carbocyclic ring containing five to six carbon atoms which in turn may have alkyl substituents containing a total of no more than four additional carbon atoms. In addition, $R_3$ and $R_4$ taken together with the carbon atoms to which they are joined may form a carbocyclic ring containing five to six carbon atoms which in turn may have alkyl substituents containing a total of no more than four additional carbon atoms. The total number of carbon atoms in the condensed heterocyclic compound of this invention should not exceed twenty-four. The preferred embodiments are those in which $R_1$ and $R_4$ are alkyl groups, $R_2$ is a hydrogen atom, and $R_3$ is a methyl group. $R_1$, $R_3$, and $R_4$ may typically individually represent methyl, butyl, octyl, benzyl, phenylbutyl, cyclopentyl, cyclohexyl, phenyl, naphthyl, butylphenyl groups, and the like.

The symbol Q represents a chain of two to three carbon atoms between the two nitrogen atoms to which it is joined. Q may be a straight chain alkylene group, an alkyl-substituted alkylene group, or a cycloalkylene, arylene, or aralkylene group as long as there are no more than two to three carbon atoms between the two primary amino groups. While the upper limit of carbon atoms in Q is not especially critical, about eighteen is considered the practical upper limit. Also, while the group Q may contain alkyl substitutents, it is necessary that the carbon atoms directly attached to each primary amino group bear at least one hydrogen atom.

Typical representations of the heterocyclic reactants include 2,3 - dihydro - 5,7,7 - trimethyl - (7H) - imidazo[1,2-a]-pyrrole,
2,3 - dihydro - 5,6 - dimethyl - (7H) - imidazo[1,2-a]-pyrrole,
2,3 - dihydro - 5,7 - dimethyl 7 hexyl - (7H) - imidazo-[1,2-a]pyrrole,
7 - methyl - 5,7 - bis - (2-methylpropyl) - 2,3 - dihydro-(7H) - imidazo[1,2-a]pyrrole,
2,3 - dihydro - 5,7 - dimethyl - 7 - (2,2 - dimethylpropyl)-(7H) - imidazo[1,2-a]pyrrole,
2,3 - dihydro - 2 (or 3),5,7,7 - tetramethyl - (7H)imidazo-[1,2-a]pyrolle,
2 (or 3), 5 - dimethyl - 5,7 - diphenyl - 2,3 - dihydro-(7H) - imidazo[1,2-a]-pyrrole,
2(or 3),5 - dimethyl - 2,3,7,7,8,9,9a - hexahydro - (6H)-iso-indolo[1,2-a]imidazole,
spiro{3,3-dimethylbicyclo(2.2.1)heptane-2,7' - [2'(or 3')-methyl-2',3'-dihydro-(7'H)-imidazo[1,2-a]pyrrole},
2(or 3),7,9,9 - tetramethyl - 2,3,6,7,8,8a-hexahydro(9H)-indolo[1,2-a]imidazole,
6,8,8-trimethyl-2,3,4,8 - tetrahydropyrrole[1,2 - a]pyrimidine.
spiro{cyclohexane - 1,10'[2',3',4',6',7',8',9',10' - octahydroindolo[1,2-a]pyrimidine]},
6 - methyl - 2,3,4,7,8,9 - hexahydroisoindole[1,2-a]pyrimidine,
6,8-dimethyl-8-(2,2-dimethylpropyl)-2,3,4,8 - tetrahydro-pyrrolo[1,2-a]pyrimidine, and
1,3,3-trimethyl(3H)-pyrrolo[1,2-a]benzimidazole.

The present hydrogenation is carried out in the presence of a catalyst. Suitable as catalysts are Raney nickel, Raney cobalt, cobalt with ammonia, nickel with ammonia, cobalt-copper, nickel-cobalt, palladium, platinum, ruthenium, and the like. The catalyst may be employed in any convenient particle size. Generally, the smaller particle sizes produce the higher rates. If desired, the catalyst may be deposited on a carrier material in order to extend and activate it. Suitable for use as a carrier are activated alumina, activated clays, silica gel, charcoal, asbestos, pumice, and the like. Room temperatures and somewhat above may be employed when a noble metal is used as the catalyst. When the other materials are employed as catalysts, temperatures in the range of about 75° to 250° C. are employed with about 100° to 200° C. preferred. It is preferred that the hydrogenation be carried out at the lowest temperature at which reduction can occur within the ranges previously set out. An inert, volatile, organic solvent may be desirable, such as hydrocarbons, alcohols, ethers, and the like. The lower alkanols, such as methanol or ethanol, are particularly suited for this use. When noble metals are used as catalysts, a small amount of an activating acid, such as acetic or hydrochloric, may be employed.

Pressures in the range of atmospheric to 10,000 p.s.i.g. are employed. Actually, higher pressures may be used if desired but, in most instances, no apparent advantages are achieved for the extra effort extended. The reaction shown proceeds a little more rapidly at the higher pressures but lower pressures may be successfully employed with some of the catalysts, especially Raney nickel. The preferred range of pressures is atmospheric to 100 p.s.i.g. when noble metal catalysts are employed and 250 to 5000 p.s.i.g. when the transition metal catalysts are used.

The present reaction should be concluded as soon as one mole of hydrogen has reacted. Otherwise, if the reaction is conducted for periods of time that are substantially longer than that required for one mole of hydrogen to react, there is some chance that hydrogenolysis of the ring may occur. In some instances, this has been observed when the reaction was conducted for prolonged periods of time. While no specific time limit in minutes or hours can be given, since actual times will vary with heterocyclic reactants, catalysts, temperatures, and pressures, it is emphasized that the reaction should be concluded after substantially one mole of hydrogen has reacted.

A preferred way of consummating the present reaction is to introduce the heterocyclic reactant along with a catalyst of the type described heretofore into a pressure retention reaction vessel and add hydrogen until a certain desired pressure is reached. The reaction vessel or at least the reaction ingredients may be preferably agitated such as by shaking or rotating until a precalculated drop in pressure is observed. This significant drop in pressure indicates that an equivalent amount of hydrogen has reacted. This precalculated pressure drop, indicating that an equivalent amount of hydrogen has reacted, is readily calculable by known methods. Therefore, an indication of reaction completion may be readily calculated and observed.

At the conclusion of the reaction, the product is obtained by filtering off the catalyst and stripping off the solvent. If desired, the products may be purified by distillation or recrystallization from hydrocarbons, ethers, or the like.

The products that are thus obtained are stable, strong bases having ionization constants in the range of $10^{-2}$ to $10^{-4}$. The products are good catalysts for reactions demanding strong bases. For example, they catalyze the addition of hydrocyanic acid and of mercaptans to acrylate esters. They form valuable stable salts with penicillin and they form useful stable salts with 2,4-dichlorophenoxyacetic acid and 2,4,5-trichlorophenoxyacetic acid. The present products are useful fungicides against Monilinia fructicola and Stemphylium sarcinaeforme in amounts as low as about 10 parts per million. Particularly effective in this respect are 5,7,7-trimethyl-2,3,5,6-tetrahydro-(7H)-imidazo-[1,2-a]pyrrole and 2(or 3)5,7,7-trimethyl-2,3,5,6-tetrahydro-(7H)-imidazo[1,2-a]pyrrole. The products of this invention have unusual stability over the corresponding reactants particularly with respect to hydrolysis under accelerated alkaline or acid conditions. In this respect, the present products are hydrolyzed much less rapidly than is the corresponding reactant. Accordingly, the present products have a range of utilities not available to the corresponding reactants, a condition not predictable from known circumstances.

The compounds of this invention have been presented in their free-base form and in this free-base form, they possess the valuable characteristics and concurrent utilities previously referred to. However, it is to be construed that the present invention includes the acid addition salts of these free-base products. It is desirable, in some instances, to employ the present products in their water-soluble salt form. For instance, in pesticidal applications, it is highly desirable to deal with water-soluble compounds in order that satisfactory spray solutions may be formulated. In other applications, wherein any physiological benefits are desired, it is frequently advantageous to employ the present products in this physiologically acceptable organic salt form in order to provide the stability and physiology required.

In order to prepare the salt forms of the present compounds, it is necessary only to react these compounds with a stoichiometric amount of the selected acid. The salt formation occurs readily at room temperature without the aid of a catalyst. If solid reactants are employed, it may be advantageous to use an inert volatile solvent such as benzene, toluene, xylene, hexane, heptane, methylene chloride, chloroform and the like. The solvent can then be readily removed at the conclusion of the reaction by conventional methods. The salt product does not require any further purification although recrystallization from a solvent such as isooctane may be resorted to if a product of high purity is demanded.

While it is believed clear to one skilled in the art from the above description how the salts are prepared, such salt formation may be specifically illustrated by indicating that one takes an equivalent amount of a selected compound of this invention in its free-base form and then adds a stoichiometric amount of a selected acid, for instance 36.5 parts of hydrochloric acid, 98 parts of sulfuric acid, 60 parts of acetic acid, 72 parts of acrylic acid and the like. The corresponding hydrochloric, sulfuric, acetic and acrylic acid addition salts respectively are readily formed. Similarly, other salt products may be prepared.

Typical organic and inorganic acids that may be employed are formic acid, acetic acid, propionic acid, butyric acid, caproic acid, capric acid, lauric acid, myristic acid, palmitic acid, stearic acid, acrylic acid, methacrylic acid, crotonic acid, undecylenic acid, oleic acid, linoleic acid, linolenic acid, ricinoleic acid, propiolic acid, butynoic acid, cyclobutanecarboxylic acid, norcamphane-2-carboxylic acid, benzoic acid, resorcylic acid, oxalic acid, succinic acid, glutaric acid, adipic acid, sebacic acid, salicylic acid, maleic acid, fumaric acid, glutaconic acid, saccharic acid, dodecanedioic acid, octendioic acid, cyclohexaneacetic acid, cyclopentaneacetic acid, tridecanoic acid, hexynedioic acid, phthalic acid, cinnamic acid, benzenesulfonic acid, ethanesulfonic acid, naphthalenesulfonic acid, toluenesulfinic acid, glutamic acid, glyoxalic acid, phenylglyoxalic acid, pyruvic acid, levulinic acid, hydrochloric acid, hydrobromic acid, sulfuric acid, perchloric acid, carbonic acid nitric acid, and phosphoric acid.

The compounds of this invention, as well as the methods for their preparation, may be more fully understood from the following examples which are offered by way of illustration and not by way of limitation. Parts by weight are used throughout.

*Example 1*

There are added to a hydrogenation vessel 10 parts of Raney nickel and 110 parts of 5,7,7-trimethyl-2,3-dihydro-(7H)-imidazo[1,2-a]pyrrole. The mixture is pressurized with hydrogen at an initial pressure of 1780 p.s.i.g. The mixture is agitated and heated. Hydrogen absorption begins at about 90° C. and in the range of 120° to 130° C., the reaction is quite rapid. At the end of one and one-half hours, the theoretical amount of hydrogen is absorbed. The vessel is cooled and vented. The reaction mixture is filtered and the precipitate is rinsed with methanol. The combined filtrates are fractionated at reduced pressure yielding the product 5,7,7-trimethyl-2,3,5,6-tetrahydro-(7H)-imidazo[1,2-a]pyrrole, which has an atmospheric boiling point of 202° to 204° C., an $n_D^{25}$ value of 1.4738, and a neutral equivalent of 151.5. The yield is 87%. In a similar manner, there are produced from 2,3-dihydro-5,6-dimethyl-(7H)-imidazo[1,2-a]pyrrole, 2,3-dihydro-5,7-dimethyl-7-hexyl-(7H)-imidazo[1,2-a]pyrrole, 7-methyl-5,7-bis(2-methylpropyl)-2,3-dihydro-(7H)-imidazo[1,2-a]pyrrole, and 2,3-dihydro-5,7-dimethyl-7-(2,2-dimethylpropyl)-(7H)-imidazo-[1,2-a]-pyrrole, the products 2,3,5,6-tetrahydro-5,6-dimethyl-(7H)-imidazo[1,2-a]pyrrole, 2,3,5,6-tetrahydro-5,7-dimethyl-7-hexyl-(7H)-imidazo[1,2-a]pyrrole, 7-methyl-5,7-bis(2-methylpropyl)-2,3,5,6-tetrahydro-(7H)-imidazo[1,2-a]pyrrole, and 2,3,5,6-tetrahydro-5,7-dimethyl-7-(2,2-dimethylpropyl)-(7H)-imidazo-[1,2-a]pyrrole, respectively.

*Example 2*

There are introduced into a reaction vessel 100 parts of 2,3-dihydro-2,(or 3),5,7,7-tetramethyl-(7H)-imidazo[1,2-a]pyrrole, 100 parts of methanol and 5 parts of Raney nickel. The vessel is pressurized with hydrogen at 1200 p.s.i.g. and the mixture is heated to 135° to 150° C. At the end of three hours, the vessel is cooled and vented. The reaction mixture is filtered and the precipitate is rinsed with methanol. The combined filtrates are fractionated under reduced pressure giving the product 2,3,5,6-tetrahydro-2,(or 3),5,7,7-tetramethyl-(7H)-imidazo[1,2-a]pyrrole.

In like manner,

2(or 3),5-dimethyl-5,7-diphenyl-2,3-dihydro-(7H)-imidazo[1,2-a]pyrrole,
2(or 3),5-dimethyl-2,3,7,8,9,9a-hexahydro-(6H)-isoindolo[1,2-a]imidazole,
spiro{3,3 - dimethylbicyclo(2.2.1)heptane-2,7'[2'(or 3')-methyl-2',3'-dihydro(7'H)-imidazo[1,2-a]pyrrole]}, and
2(or 3),7,9,9-tetramethyl-2,3,6,7,8,8a-hexahydro-(9H)-indolo[1,2-a]imidazole yield 2(or 3),5-dimethyl-5,7-diphenyl-2,3,5,6-tetrahydro-(7H)-imidazo-[1,2-a]pyrrole,
2(or 3),5-dimethyl-2,3,5,5a,7,8,9,9a-octahydro-(6H)isoindolo[1,2-a]imidazole,
spiro{3,3-dimethylbicyclo(2.2.1)-heptane-2,7'[2'(or 3')-methyl-2',3',5',6'-tetrahydro-(7' H)-imidazo-[1,2-a]pyrrole]} and
2(or 3)7,9,9 - tetramethyl - 2,3,4a,5,6,7,8,8a - octahydro-(9H)-indolo[1,2-a]imidazole, respectively.

Example 3

There are introduced into a reaction vessel 50 parts of 6,8,8-trimethyl - 2,3,4,8 - tetrahydropyrrolo[1,2-a]pyrimidine, 25 parts of ethanol and 5 parts of Raney cobalt. The vessel is pressurized with hydrogen at 2200 p.s.i.g. at 28° C. The reaction mixture is agitated and heated gradually to 155° to 175° C. At the end of two and one-half hours, the reaction is complete and the vessel is cooled and vented. The contents of the vessel are filtered and the combined filtrates are stripped and distilled under reduced pressure yielding the product, 6,8,8-trimethyl-2,3,4,6,7,8-hexahydropyrrolo[1,2-a]pyrimidine. In a similar manner, there are produced spiro{cyclohexane - 1,10'[2',3',4',5a',6',7',8',9',9a',10'-decahydroindolo[1,2-a]pyrimidine]},
6-methyl-2,3,4,6,6a,7,8,9,10,10a - decahydroisoindolo[1,2-a]pyrimidine, and
6,8-dimethyl-8-(2,2-dimethylpropyl)-2,3,4,6,7,8 - hexahydropyrrolo-[1,2-a]pyrimidine from spiro{cyclohexane-1,10'[2',3',4',6',7',8',9',10', -octahydroindolo[1,2-a]pyrimidine]},
6-methyl-2,3,4,7,8,9,10,10a - octahydroisoindolo[1,2-a]pyrimidine, and
6,8 - dimethyl-8-(2,2-dimethylpropyl)2,3,4,8 - tetrahydropyrrolo[1,2-a]pyrimidine, respectively.

Example 4

There are added to a hydrogenation bomb 20 parts of 1,3,3 - trimethyl-(3H) - pyrrolo[1,2-a]benzimidazole, 40 parts of methanol, and 4 parts of Raney nickel catalyst. The bomb is pressurized with hydrogen to 2800 p.s.i.g. at 26° C. The reaction mixture is agitated and heated to 175° to 180° C. and maintained at that level until one mole of hydrogen is absorbed per mole of reactant. The reaction vessel is then cooled and vented. The reaction mixture is filtered and the precipitate rinsed with methanol. The combined filtrates are fractionated under reduced pressure yielding the product, 1,3,3-trimethyl-1,2-dihydro-(3H)-pyrrolo[1,2-a]benzimidazole. In a similar way, there are obtained spiro{cyclohexane - 1,11'-[1',2',3',4',4a',11a'-hexahydro-(11'H)-indolo[1,2-a]benzimidazole]} and
1,2,3,4,4a,11a-hexhydro-(11H) - indolo[1,2-a]benzimidazole from spiro{cyclohexane-1,11'-[1',2',3',4'-tetrahydro-(11'H) - indolo[1,2-a]-benzimidazole]} and
1,2,3,4-tetrahydro-(11H)-indolo[1,2-a]-benzimidazole, respectively.

We claim:

1. As a composition of matter, a member from the class consisting of a compound having the formula

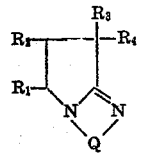

and the acid addition salts thereof, in which $R_1$ taken individually represents a member from the class consisting of alkyl, phenylalkyl, cycloalkyl, phenyl, naphthyl, and alkylphenyl groups of no more than 10 carbon atoms, $R_2$ taken individually represents a member from the class consisting of a hydrogen atom and an alkyl group of 1 to 4 carbon atoms, $R_3$ and $R_4$ taken individually represent members from the class consisting of alkyl, cycloalkyl, phenylalkyl, phenyl, naphthyl, and alkylphenyl groups of no more than 10 carbon atoms, $R_1$ and $R_2$ taken collectively form a saturated carbocyclic ring of 5 to 6 carbon atoms, and said ring having alkyl substituents consisting of a total of no more than 4 carbon atoms, $R_2$ and $R_3$ taken collectively with the carbon atoms to which they are joined form a member from the class consisting of a saturated carbocyclic ring of 5 to 6 carbon atoms and said ring having alkyl substituents consisting of a total of no more than 4 carbon atoms, and $R_3$ and $R_4$ taken collectively with the carbon atoms to which they are joined form a member from the class consisting of a saturated carbocyclic ring of 5 to 6 carbon atoms and said ring having alkyl substituents consisting of a total of no more than 4 carbon atoms, and Q is a hydrocarbon chain of 2 to 3 carbon atoms between the nitrogen atoms to which it is joined, said Q containing up to about 18 carbon atoms.

2. As a composition of matter, the compound having the formula

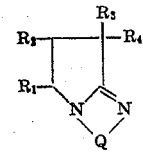

in which $R_1$ is an alkyl group of 1 to 10 carbon atoms, $R_2$ is a hydrogen atom, $R_3$ is an alkyl group of 1 to 10 carbon atoms, $R_4$ is an alkyl group of 1 to 10 carbon atoms, and Q represents an ethylene group.

3. As a composition of matter, the compound having the formula

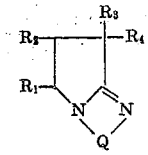

in which $R_1$ and $R_4$ are alkyl groups of 1 to 10 carbon atoms, $R_2$ is a hydrogen atom, and $R_3$ is a methyl group, and Q represents an ethylene group.

4. As a composition of matter, the compound having the formula

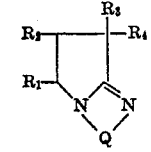

in which $R_1$ and $R_2$ taken collectively with the carbon atoms to which they are joined form a saturated carbocyclic ring of 5 to 6 carbon atoms, $R_3$ and $R_4$ are alkyl groups of 1 to 10 carbon atoms, and Q is an ethylene group.

5. As a composition of matter, the compound having the formula

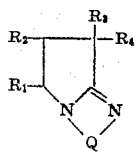

in which $R_1$ is an alkyl group of 1 to 10 carbon atoms, $R_2$ and $R_3$ taken collectively with the carbon atoms to which they are joined form a saturated carbocyclic ring of 5 to 6 carbon atoms, $R_4$ is an alkyl group of 1 to 10 carbon atoms, and Q is an ethylene group.

6. As a composition of matter, the compound having the formula

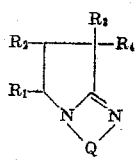

in which $R_1$ is an alkyl group of 1 to 10 carbon atoms, $R_2$ is an alkyl group of 1 to 4 carbon atoms, and $R_3$ and $R_4$ taken collectively with the carbon atom to which they are joined form a saturated carbocyclic ring of 5 to 6 carbon atoms, and Q is an ethylene group.

7. As a composition of matter, 5,7,7-trimethyl-2,3,5,6-tetrahydro-(7H)-imidazo[1,2-a]pyrrole.

8. As a composition of matter, 2,3,5,6-tetrahydro-2,5,7,7-tetramethyl-(7H)-imidazo[1,2-a]pyrrole.

9. As a composition of matter, 6,8,8-trimethyl-2,3,4,6,7,8-hexahydropyrrolo[1,2-a]-pyrimidine.

10. As a composition of matter, 1,3,3-trimethyl-1,2-dihydro-(3H)-pyrrolo[1,2-a]benzimidazole.

11. As a composition of matter, spiro{cyclohexane-1,10' - [2',3',4',5a',6',7',8',9',9a',10' - decahydroindole-[1,2-a]pyrimidine]}.

12. A method for the preparation of a compound having the formula

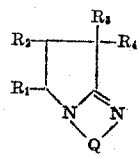

which comprises reacting with hydrogen in a temperature range of about 25° to 250° C. in the presence of a hydrogenation catalyst, a compound represented by the formula

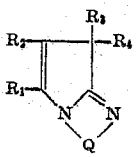

until substantially equimolecular amounts of the hydrogen and said compound reactant have reacted, in which $R_1$ taken individually represents a member from the class consisting of alkyl, phenylalkyl, cycloalkyl, phenyl, naphthyl, and alkylphenyl groups of no more than 10 carbon atoms, $R_2$ taken individually represents a member from the class consisting of a hydrogen atom and an alkyl group of 1 to 4 carbon atoms, $R_3$ and $R_4$ taken individually represent members from the class consisting of alkyl, cycloalkyl, phenylalkyl, phenyl, naphthyl, and alkylphenyl groups of no more than 10 carbon atoms, $R_1$ and $R_2$ taken collectively form a saturated carbocyclic ring of 5 to 6 carbon atoms, and said ring having alkyl substituents consisting of a total of no more than 4 carbon atoms, $R_2$ and $R_3$ taken collectively with the carbon atoms to which they are joined form a member from the class consisting of a saturated carbocyclic ring of 5 to 6 carbon atoms and said ring having alkyl substituents consisting of a total of no more than 4 carbon atoms, and $R_3$ and $R_4$ taken collectively with the carbon atoms to which they are joined form a member from the class consisting of a saturated carbocyclic ring of 5 to 6 carbon atoms and said ring having alkyl substituents consisting of a total of no more than 4 carbon atoms, and Q is a hydrocarbon chain of 2 to 3 carbon atoms between the nitrogen atoms to which it is joined, said Q containing up to about 18 carbon atoms.

13. A method according to claim 12 in which the temperatures employed are in the range of about 75° to 250° C. and the method is conducted in the presence of an inert volatile organic solvent.

14. A method according to claim 12 in which the reaction is conducted in the temperature range of about 100° to 200° C. in the presence of an inert volatile organic solvent and at pressures up to about 10,000 p.s.i.g.

15. A method according to claim 12 in which the catalyst employed is a noble metal and reaction is conducted in the presence of a lower alkanol and at pressures ranging from atmospheric to 100 p.s.i.g.

16. A method according to claim 12 in which the heterocyclic reactant is added with a catalyst to pressure retention reaction vessel and then the hydrogen is introduced until the selected pressure is reached in the range of up to about 10,000 p.s.i.g.

References Cited in the file of this patent

Whitmore: "Organic Chemistry," (second edition, 1951, D. van Nostrand-Pub.), page 552.